(12) United States Patent
Sakamoto et al.

(10) Patent No.: US 9,012,015 B2
(45) Date of Patent: Apr. 21, 2015

(54) LAMINATED GLASS WITH PLASTIC FILM INSERT

(75) Inventors: Hiromichi Sakamoto, Matsusaka (JP); Atsushi Takamatsu, Matsusaka (JP); Kensuke Izutani, Matsusaka (JP); Isao Nakamura, Ise (JP)

(73) Assignee: Central Glass Company, Limited, Ube-shi (JP)

( * ) Notice: Subject to any disclaimer, the term of this patent is extended or adjusted under 35 U.S.C. 154(b) by 788 days.

(21) Appl. No.: 13/142,967

(22) PCT Filed: Feb. 4, 2010

(86) PCT No.: PCT/JP2010/051587
§ 371 (c)(1),
(2), (4) Date: Jun. 30, 2011

(87) PCT Pub. No.: WO2010/090250
PCT Pub. Date: Aug. 12, 2010

(65) Prior Publication Data
US 2011/0287229 A1    Nov. 24, 2011

(30) Foreign Application Priority Data

Feb. 5, 2009    (JP) .................................. 2009-024409

(51) Int. Cl.
*B32B 1/00* (2006.01)
*B32B 17/06* (2006.01)
(Continued)

(52) U.S. Cl.
CPC ........... *B32B 17/10036* (2013.01); *B32B 17/10* (2013.01)

(58) Field of Classification Search
CPC .. B29C 47/0038; B29K 2023/06; B32B 3/28; B32B 17/1055; B32B 17/10; B32B 17/10036; B32B 2367/00; B32B 2369/00; B32B 17/064; Y10S 428/91

USPC ......... 428/174, 426, 430, 436, 437, 483, 910, 428/441, 480; 359/359
See application file for complete search history.

(56) References Cited

U.S. PATENT DOCUMENTS

| 4,368,945 A | 1/1983 | Fujimori et al. |
| 4,985,312 A | 1/1991 | Furuya et al. |

(Continued)

FOREIGN PATENT DOCUMENTS

| CN | 1476384 A | 2/2004 |
| CN | 101288007 A | 10/2008 |

(Continued)

OTHER PUBLICATIONS

Translation of JP 60-225747, Suzuki et al., published Nov. 11, 1985.*

(Continued)

*Primary Examiner* — Catherine A Simone
(74) *Attorney, Agent, or Firm* — Crowell & Moring LLP (57) ABSTRACT

In a laminated glass, a plastic film is sandwiched between two sheets of resin intermediate film, and an infrared reflective film is formed in the plastic film by alternatively laminating resin films of different refractive indexes. The plastic film on which the infrared reflective film is formed meets any of the following conditions: (A) thermal shrinkage of 0.5 to 3% in the 90 through 150° C. temperature range, (B) modulus of elasticity in the range of 30 through 2000 MPa in a temperature range of 90 through 150° C., and (C) a rate of elongation of the plastic film of 0.3% or less when 10 N tensile force per 1 m width of the plastic film is exerted in the 90 through 150° C. temperature range. This laminated glass is a curved infrared ray reflective laminated glass, with high transmissivity to visible light, high reflectivity in the infrared ray region, excellent insulating effect, and will transmit various electromagnetic waves.

6 Claims, 5 Drawing Sheets

(51) Int. Cl.
  *B32B 3/00* (2006.01)
  *B32B 17/10* (2006.01)

(56) References Cited

U.S. PATENT DOCUMENTS

| | | | |
|---|---|---|---|
| 5,091,258 | A | 2/1992 | Moran |
| 5,103,337 | A | 4/1992 | Schrenk et al. |
| 5,126,880 | A | 6/1992 | Wheatley et al. |
| 5,830,568 | A | 11/1998 | Kondo |
| 6,797,396 | B1 * | 9/2004 | Liu et al. ............ 428/483 |
| 7,494,702 | B2 | 2/2009 | Oya |
| 2002/0086926 | A1 * | 7/2002 | Fisher ............ 524/403 |
| 2004/0069977 | A1 | 4/2004 | Oya et al. |
| 2007/0273964 | A1 | 11/2007 | Oya |
| 2009/0011230 | A1 | 1/2009 | Rymer et al. |

FOREIGN PATENT DOCUMENTS

| | | | |
|---|---|---|---|
| JP | 56-32352 | A | 4/1981 |
| JP | 60-225747 | A | 11/1985 |
| JP | 2-160641 | A | 6/1990 |
| JP | 4-295804 | A | 10/1992 |
| JP | 4-313704 | A | 11/1992 |
| JP | 6-270318 | A | 9/1994 |
| JP | 8-259279 | A | 10/1996 |
| JP | 2846468 | B2 | 1/1999 |
| JP | 2001-106556 | A | 4/2001 |
| JP | 2001-310407 | A | 11/2001 |
| JP | 2002-220262 | A | 8/2002 |
| JP | 2003-515754 | A | 5/2003 |
| JP | 2007-148330 | A | 6/2007 |
| WO | WO 01/38907 | A1 | 5/2001 |
| WO | WO 01/96104 | A2 | 12/2001 |
| WO | WO 2005/040868 | A1 | 5/2005 |
| WO | WO 2008/024612 | A1 | 2/2008 |
| WO | WO 2008/039688 | A1 | 4/2008 |
| WO | WO 2008/085680 | A1 | 7/2008 |
| WO | WO 2009/016955 | A1 | 2/2009 |

OTHER PUBLICATIONS

European Search Report dated Nov. 13, 2012 (seven (7) pages).
Chinese Office Action Dated Jul. 19, 2013 with Japanese Translation (Seventeen (17) pages).
Corresponding International Search Report (Form PCT/ISA/210) dated Mar. 9, 2010 with English Translation including Form PCT/ISA/237 (nine(9) pages).
Partial English translation (JP 1985-225747 A) previously submitted Jun. 30, 2011 (three (3) pages).
European Office Action dated Apr. 23, 2014 (eleven (11) pages).
European Office Action dated Apr. 25, 2014 (four (4) pages).

* cited by examiner

LAMINATED GLASS WITH PLASTIC FILM INSERT

TECHNICAL FIELD

The present invention relates to a laminated glass prepared by laminating a glass plate, a resin intermediate film, a transparent plastic film, another resin intermediate film, and another glass plate in this sequence and, more particularly, relates to the laminated glass having an infrared ray reflective film formed on the transparent plastic film and having a heat insulation function.

BACKGROUND ART

Many trials to produce a pleasant interior space have been made by suppressing a temperature rise in the interior space, with a heat radiation energy of sun light flowing into the interior space via a window glass reduced, by suppressing a consumption of an electrical energy consumed through a drive of a cooling device, and by maintaining a high visible light transmittance of the window glass.

A patent document 1 describes that it has been proposed that the laminated glass having a resin interlayer film interposed between at least two sheets of transparent glass plate-like body, electrically conductive ultra-fine particles, each of the ultra-fine particles having a particle diameter up to 0.2 μm, are dispersed in the interlayer film so that the laminated glass having a solar transmittance which can be reduced to about 50% while the transmittance in a visible light area is highly maintained can be achieved.

It should, however, be noted that, since the laminated glass disclosed in patent document 1 serves to absorb light in the infrared area, the laminated glass itself becomes warm to increase the temperature, and radiant rays directed from the laminated glass to the interior space called a re-radiation for the radiation against sun light rays are radiated, the temperature in the interior space is raised after a lapse of a long time.

A patent document 2 discloses an infrared ray reflective film which is a lamination of dielectrics having different indexes of refractions, as the infrared ray reflective film which reflects the infrared ray without use of the electrically conductive film. In addition, each of patent documents 3 and 4 discloses the infrared ray reflective film which is a lamination of resin films having different indexes of refractions.

It is known as the laminated glass having a heat ray reflection function that the laminated glass is prepared using a three-layer structure intermediate film in which the transparent plastic film on which the infrared reflective film is formed is inserted between the two sheets of resin intermediate film.

Ordinarily, the laminated glass is processed at a high temperature and under a high pressure using an autoclave. Thus, the glass plate and three-layer structure intermediate film are heat molten to each other by means of the resin intermediate film.

For example, a patent document 5 discloses the laminated glass in which a flexible lamination body in which a heat-ray reflective plastic film formed by a thin film on a polyester film is sandwiched between two sheets of resin intermediate film is inserted between two sheets of glass plate to be laminated.

In addition, patent document 4 discloses an infrared ray shielding film constituted by a multiple number of plastic layers and sandwiched between two sheets of polyvinyl butyral sheet, this infrared ray shielding film being sandwiched between two sheets of glass plate. Patent document 4 also describes that this infrared ray shielding film has the shrinkage of 2% or smaller under a process of 150° C. and for 30 minutes in both of a film formation direction thereof and in a width direction thereof, from a viewpoint of preventing an occurrence of cracks and a peeling off between the glass and the film after an adherence of the glass plates on the infra-red ray shielding film, and has a shrinkage difference of 0.5% or smaller under the process of 150° C. and for 30 minutes, from the viewpoint of preventing a wrinkle generation.

Furthermore, a patent document 6 describes that a functional film having a selective light transmittance and an electrical conductivity is sandwiched between polyvinyl butyral (PVB) films to form the laminated glass, in order to prevent a defect such as a wrinkle when a polyethylene terephthalate film is sandwiched between two sheets of PVB film and is laminated to form the laminated glass and, in order to prevent an outer appearance default such as a wrinkle, a thermal expansion rate of a polyester terephthalate used for the functional film is 0.1 through 1.0% in one direction, and the thermal shrinkage of the polyester terephthalate in an orthogonal direction to the one direction is 0.1 through 1.0%. A patent document 7 describes that an infrared ray reflective film in which a film of oxide indium or silver is formed on a plastic film is used and the infrared ray reflective film having the thermal shrinkage of the plastic film during a thermal process of the plastic film of 1 through 20% when preparing the laminated glass.

As a film to reflect the infrared ray, patent documents 8 and 9 describe the infrared ray reflective films including resin multi-layer films.

PRE-PUBLISHED DOCUMENT

Patent Document

Patent document 1: a Japanese Patent Application first Publication (tokkai) No. Heisei 8-259279;
Patent document 2: a Japanese Patent Application first Publication (tokkai) No. Heisei 2-160641;
Patent document 3: a Japanese Patent Application first Publication (tokuhyo) No. 2003-515754;
Patent document 4: a Japanese Patent Application first Publication (saikohyo) No. 2005-040868;
Patent document 5: a Japanese Patent Application first Publication (tokkai) No. Showa 56-032352;
Patent document 6: a Japanese Patent Application first Publication (tokkai) No. Showa 60-225747;
Patent document 7: a Japanese Patent Application first Publication (tokkai) No. Heisei 6-270318;
Patent document 8: a Japanese Patent Application first Publication (tokkai) No. Heisei 4-295804; and
Patent document 9: a Japanese Patent Application first Publication (tokkai) No. Heisei 4-313704.

DISCLOSURE OF THE INVENTION

It is an object of the present invention to provide a laminated glass having a high visible light transmittance, having a high index of reflection in an infrared ray region and a favorable heat insulation effect in the infrared ray region, and of an infrared reflection of a curved surface form.

According to one aspect of the present invention, there is provided a laminated glass with a plastic film insert (a fist glass), prepared using a film constituted by grasping the plastic film between two sheets of resin intermediate film, comprising: a glass plate bent through a bending process thereof; and the film, wherein the plastic film is one plastic film selected from polyethylene terephthalate, polyethylene naphthalate, polycarbonate, polymethylmethacrylate, polyether sulfone, nylon, polyarylate, and cycloolefin polymer, a thickness of the plastic film ranges from 30 to 200 µm, an infrared ray reflective film in which resin films having different indexes of refractions are alternately laminated is formed on the plastic film, and the plastic film on which the infrared ray reflective films is formed satisfies any of the following conditions of (A): a thermal shrinkage of the plastic film falls in a range from 0.5% to 3% in a temperature range of 90 through 150° C., (B): a modulus of elasticity falls in a range from 30 MPa to 2000 MPa, and (C): a rate of elongation of the plastic film is 0.3% or less when a tensile force of 10 N is applied to the plastic film per one-meter width.

The first glass may be the laminated glass with the plastic film insert (a second glass), wherein a radius of curvature of the bent glass plate is in a range from 0.9 m to 3 m.

The first or second glass may be the laminated glass with the plastic film insert (a third glass), wherein the infrared ray reflective film comprises a mufti-layer film having a number of layers of 50 through 200 and having an alternate lamination of a resin film (1) and a resin film (2), both of the resin films having different indexes of refraction.

Any one of the first through third glasses may be the laminated glass with the plastic film insert (a fourth glass), wherein the infrared ray reflective film is formed with unit lamination films laminated by 2 through 6 with thicknesses of t1 and t2 varied, each of the unit lamination films being an alternate lamination of totally 10 through 40 layers of a resin film (1) having the thickness of t1 and another resin film (2) having the thickness of t2.

Any one of the first through fourth glasses may be the laminated glass with the plastic film insert (a fifth glass), wherein one sheet of resin intermediate film is an infrared ray absorption film containing particles of an electrically conductive oxide for an infrared ray absorbing material and a thickness of the resin intermediate film is in a range from 0.3 through 1.2 mm.

Any one of the first through fifth glasses may be the laminated glass with the plastic film insert (a sixth glass), wherein a hard coat film is formed on an interface between the plastic film and the resin intermediate film.

Any one of the first through sixth glasses may be the laminated glass with the plastic film insert (a seventh glass), wherein a film of a silane coupling agent is formed on an interface between the plastic film and the resin intermediate films.

Any one of the first through seventh glasses may be the laminated glass with the plastic film insert (an eighth glass), wherein a film of a silane coupling agent is formed on an interface between the hard coat film and the resin intermediate film.

DETAILED DESCRIPTION

A laminated glass with a plastic film insert according to the present invention enables a provision of the laminated glass with the plastic film insert having a high index of reflection in a visible light region, having a favorable heat insulation effect, and having no wrinkle of the inserted plastic film and no peeling off of an infrared ray reflective film.

The laminated glass with the plastic film insert according to the present invention is the laminated glass of the curved surface shape laminated in a sequence of an exterior side glass plate, an exterior side resin intermediate film, a plastic film on which an infrared ray reflective film is formed, an interior side resin intermediate film, and an interior side glass plate.

Figure 1:
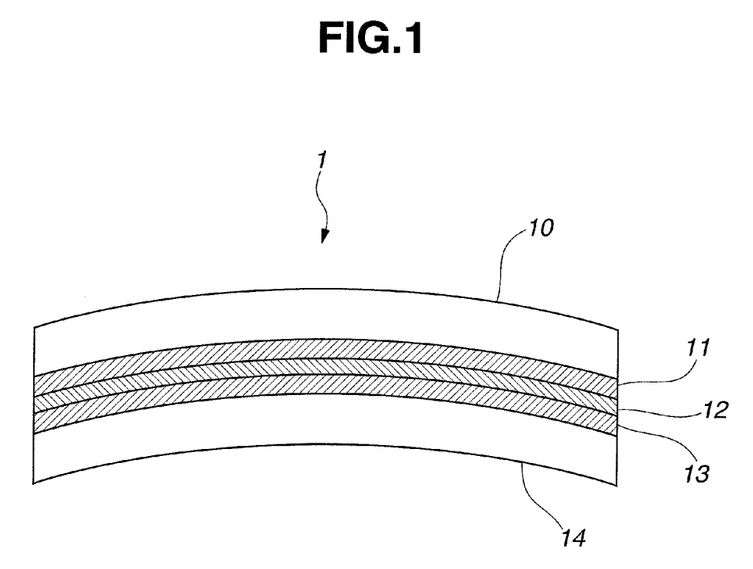
FIG. 1 is a rough cross sectional view representing a structure of a laminated glass with a plastic film insert according to the present invention using a curved glass plate.

A cross sectional view shown in FIG. 1 diagrammatically shows a structure of the laminated glass with the plastic film insert according to the present invention. For the exterior side glass plate, a curved glass plate having a solar transmittance equal to or larger than 85% and which is under a bending process for a soda lime series glass plate manufactured by a float method is suitably used.

The solar transmittance is a value calculated on a basis of JIS R3106: 1998. A colorless transparent Ethylene-Vinyl-Acetate (EVA) or PolyVinyl Butyral (PVB) is suitably used for the exterior side resin intermediate film.

In order to effectuate an effect of the infrared ray reflective film and to effectuate a heat insulation performance of the laminated glass, it is desirable for the solar transmittance of the exterior side resin intermediate film to be equal to or larger than 85%.

The plastic film on which the infrared ray reflective film is a formation of the infrared ray reflective film on a transparent plastic film. It is preferable for the solar transmittance of the plastic film on which the infrared ray reflective film is formed to be equal to or larger than 20%.

For the plastic film on which the infrared ray reflective film is formed, the plastic film made of the resin selected from polyethylene terephthalate, polyethylene naphthalate, polycarbonate, polymethylmethacrylate, polyether sulfone, nylon, polyarylate, cycloolefin polymer, or so forth is suitably used.

If a thickness of the plastic film is thinner than 30 µm, a handling of the film is difficult and it is easy to be curled due to a stress of the infrared ray reflective film or a hard coat film as will be described later. On the other hand, if the thickness thereof is thicker than 200 µm, an outer appearance defect occurs due to a degassing failure at a time of a lamination process. Hence, the thickness desirably falls within a range of 30 µm through 200 µm.

An electromagnetic wave used for broadcasting and communications is preferably transmitted if a multiple layer film of resins having different refractive indexes are used as the infrared ray reflective film laminated on the plastic film.

It is preferable that the infrared ray reflective film is a mufti-layer film having the number of layers of 50 through 200 by alternately laminating the resin films of different indexes of refractions. If the number of layers are less than 50 layers, the refraction index is small and, if the number of layers are in excess of 200 layers, the refraction index does not become large. Thus, it is preferable for this multi-layer film to be equal to or less than 200 layers.

Furthermore, a resin film (1) having a thickness of t1 and a resin film (2) having the thickness of t2, both of resin films being mutually different indexes of refractions, are alternately laminated by 10 through 40 layers to form a unit lamination film. If the number of unit lamination films with thicknesses t1, t2 changed are 2 through 6, a range of a reflection wavelength can preferably be widened.

The resin used for the infrared ray reflective film is selected from polymethylmethacrylate, polyethylene, polystyrene, polycarbonate, a blend of polyvinylidene fluoride and polymethylmethacrylate, a copolymer of ethylene and unsaturated monocarboxylic acid, a copolymer of styrene and methylmethacrylate, and so forth and can suitably be used.

In the laminated glass of the curved surface shape used for the window of an automotive vehicle and so forth, the glass plate is bent in the curved surface shape. Therefore, the plastic film on which the infrared ray reflective film is formed is inserted between two sheets of resin intermediate film. When the inserted plastic film is integrated at a lamination process, a wrinkle is easy to occur on the plastic film on which the infrared ray reflective film is formed. If circumstances require, a peel-off of the reflective film is developed.

In order to prevent this phenomenon, it is preferable to satisfy either one or more of the following conditions of (A), (B), and (C) in a case of the curved glass plate having a radius of curvature in which the curvature ranges from 0.9 m to 3 m.

It should be noted that the reason of the selected range of curvature which is from 0.9 m to 3 m is that it is difficult to eliminate the occurrence of the wrinkle. If the curvature is in excess of 3 m, a difference thereof from a plane glass plate is not present and it becomes unnecessary to satisfy the following conditions of (A), (B), and (C).

(A) A thermal shrinkage of a plastic film on which the infrared ray reflective film is formed is in a range from 0.5 to 3% in a temperature range from 90° C. through 150° C.

(B) A modulus of elasticity of the plastic film on which the infrared ray reflective film is formed in a temperature range from 90 through 150° C. is in a range from 30 MPa through 2000 MPa.

(C) A rate of elongation of the plastic film on which the infrared ray reflective film is formed is equal to or less than 0.3% when a tensile force of 10 N is applied to the plastic film per 1 m width on which the infrared ray reflective film is formed in the temperature range of 90 through 150° C.

It should be noted that, if the thermal shrinkage of the plastic film on which the infrared ray reflective film is formed in the temperature range of 90 through 150° C. is smaller than 0.5%, an outer appearance defect such that the infrared ray reflective film at a surrounding section of a curved glass becomes loose and provides a wrinkle is developed.

In addition, if the thermal shrinkage is larger than 3%, the infrared ray reflective film is not durable due to the shrinkage of the film and this brings out the outer appearance defect such that the film is cracked.

Hence, in order to prevent the wrinkle of the plastic film on which the infrared ray reflective film is formed at the lamination process and the crack in the infrared ray reflective film, it is preferable for the thermal shrinkage of the plastic film on which the infrared ray reflective film is formed to fall in the range of 0.5 through 3% in the temperature range of 90 through 150° C. It is more preferable for the thermal shrinkage of the plastic film on which the infrared ray reflective film is formed in the temperature range of 90 through 150° C. to be in the range from 0.5 through 2%.

Since, in a transparent plastic film, the plastic film prepared through a stretching method such as a successively biaxial stretching method leaves a stress developed at the time of a plastic film preparation process in an inside of the plastic film and the stress is easy to be relieved at the time of a thermal processing and the plastic film becomes easy to be relieved, this transparent plastic film can suitably be used.

In addition, in a high-temperature-and-high-pressure process using an autoclave, in order to prevent a winkle from being developed on the plastic film on which the infrared ray reflective film is formed, it is desirable for a modulus of elasticity of the plastic film on which the infra-red reflective film is formed to be in a range from 30 MPa to 2000 MPa in a temperature range of 90 through 150° C. and more preferably in a range from 30 MPa to 500 MPa.

If the modulus of elasticity of the plastic film on which the plastic film is formed can be determined from a stress-strain curved line in a temperature range of 90 through 150° C. using a viscosity-elasticity measurement device. If the modulus of elasticity of the plastic film on which the infrared ray reflective film is formed is smaller than 30 Mpa, the film is easy to be deformed according to a slight external force and the outer appearance defect in a wrinkle shape is easy to be developed on a whole surface of the laminated glass.

If the modulus of elasticity of the plastic film on which the infrared ray reflective film is formed is larger than 2000 Mpa, a degassing failure is easy to occur in a case where the infrared ray reflective film is applied to a glass which is bent three-dimensionally since an air between the resin intermediate film and the plastic film on which the infrared ray reflective film is formed cannot completely be drained.

Or alternatively, under a high-temperature-and-high-pressure process by means of the autoclave, in order to prevent the wrinkle from being developed on the plastic film, the rate of elongation of the plastic film on which the infrared ray reflective film is formed is desirably 0.3% or smaller when the tensile force of 10 N per 1 m in width is applied to the plastic film on which the infrared ray reflective film is formed in the high temperature range of 90 through 150° C.

The tensile force of 10 N applied to the plastic film on which the infrared ray reflective film is formed per 1 m in width corresponds to the tensile force which is to try to elongate the plastic film on which the infrared ray reflective film is formed and which is developed on the plastic film on which the infrared ray reflective film is formed, when the plastic film grasped by the resin intermediate films is at the high temperature and under the high pressure by means of the autoclave and, thereafter, the plastic film on which the infrared ray reflective film is formed is thermally molten by means of the resin intermediate films.

The rate of elongation of the plastic film on which the infrared ray reflective film is formed is measured in the following sequence of procedures 1 through 5.

Procedure 1: The plastic film on which the infrared ray reflective film is formed is cut out to provide a dimension of 15 mm in length×5 mm in width which serves as a measurement specimen. Fixture jigs are attached on both ends of the measurement specimen and the length by which the measurement specimen is exposed between the fixture jigs at both ends is set to 10 mm.

Procedure 2: A load of tensile force of 10 N per 1 m width of the plastic film on which the infrared ray reflective film is formed is applied to the measurement specimen. In a case of the measurement specimen described in procedure 1, the load of 0.05 N is applied to the measurement specimen.

Procedure 3: A length of $L_0$ of the measurement specimen between the fixture jigs is measured.

Procedure 4: After the measurement specimen is heated up to a predetermined measurement temperature which falls in a range between 90 and 150° C. at 5° C./min and a length L of the measurement specimen between fixture jigs is measured at the predetermined measurement temperature.

Procedure 5: The rate of elongation (%) is calculated according to $(L_0-L)/L\times 100$.

It is, furthermore, preferable for a film of a silane coupling agent to be formed on a surface of the plastic film on which the infrared ray reflective film is not formed.

The silane coupling agent serves to favor an adhesion of the plastic film on which the infrared ray reflective film is formed between the surface of the plastic film on which the infrared reflective film is formed and the resin intermediate film. Then, the silane coupling agent having an amino group, an isocyanate group, an epoxy group, and so forth can be used.

In addition, it is preferable for a hard coat film to be formed between the plastic film of the plastic film on which the infrared ray reflective film is formed and the infrared ray reflective film.

It is often a case where, depending upon the plastic film to be inserted between the resin intermediate films, the adhesion of the plastic film to the resin intermediate film is not favorable and a white cloud is developed when the infrared ray reflective film is formed. These inconveniences described above can be solved by forming the hard coat film on an interface. It is preferable that the interior side resin intermediate film is constituted by a film of Ethylene-Vinyl-Acetate (EVA) or PolyVinyl Butyral (PVB) in which various kinds of fine particles for absorbing the infrared ray are included in a range that does not impede a visible light transmissivity and a coloring matter is mixed to color the interior side intermediate film to provide the solar transmittance of 75% or less.

Metallic fine particles such as Ag, Al, Ti, and so forth, fine particles of a metallic nitride and a metallic oxide or electrically conductive transparent oxide particles such as ITO, ATO, AZO, GZO, IZO, and so forth are provided as fine particles for absorbing the infrared ray described above. From among these elements described above, one kind or more are selected to be included in interior side resin intermediate film 13 so that the heat insulation performance can be improved.

Especially, it is desirable for the electrically conductive transparent oxide such as ITO, ATO, AZO, GZO, IZO, and so forth to be included in the interior side resin intermediate film.

In a case where EVA or PVB is colored, one of well known generally available various kinds of pigments or various kinds of dyes can be used as a coloring agent.

As various kinds of dyes, an anthraquinone dye, an azo dye, an acridine dye, an indigoid dye, and, as various kinds of pigments, carbon black, red iron oxide, phthalocyanine blue, Prussian blue, Zinc ointment, an azo pigment, a styrenic pigment, and so forth can be used.

Furthermore, a colored polyvinyl acetal film in which a polyvinyl acetal film is colored with the above-described dye or pigment and which is laminated with EVA or PVB may be used for the interior side resin intermediate film.

As the interior side glass plate, a heat-ray absorbing glass having the solar transmittance less than 75% and having a transmission color of green, blue, bronze, gray, or so forth can suitably be used. The above-described heat-ray absorbing glass is prepared by including a metal such as Ce, Co, Ti, Fe, Se, Cr, and so forth in a clear glass.

From among the heat-ray absorbing glasses, it is preferable to use one or more of the heat-ray absorbing glasses in a green color and in a blue color since they have highly visible light transmittances so that a bright interior room can be achieved.

A convex-and-recess shape embossing is carried out on a surface of each of resin intermediate films in order not to develop a devitrification or bubble fault due to a degassing failure at the time of the lamination process. It is difficult to make an optical measurement for each of resin intermediate films on the surface of which the embossing is carried out since the surface thereof is light scattered. The resin intermediate film on which the embossing is carried out is sandwiched by Polyethylene terephtalate (hereinafter, referred to as PET) films, and both sides of each of the films are grasped by the plane glass plates and bagged. Then, the air in the bag is absorbed. At this time, the autoclave is used to perform the pressure application and the hear processing in the same way as the preparation of the laminated glass. Thereafter, the PET films are peeled off from the respective resin intermediate films and a specimen of the resin intermediate film whose surface is plane is prepared. Then, using the resin intermediate film whose surface is plane, the visible light transmittance and the solar transmittance are calculated in the same way as the glass plate in the method which conforms to JISR3106: 1998.

It should be noted that it is preferable that the laminated glass with the plastic film insert according to the present invention can be used for the window which is needed for the driving of the automotive vehicle by making the visible light transmittance prescribed in JISR3212:1998 equal to or larger than 70%.

EMBODIMENTS

The following embodiments 1 through 4 illustrate the condition of (A) according to the present invention, embodiments 5 and 6 illustrate the condition of (B) according to the present invention, and embodiments 7 and 8 illustrate the condition of (C) according to the present invention.

The preparation of the plastic film on which the infrared ray reflective film is formed was carried out in the following way.

Figure 3:
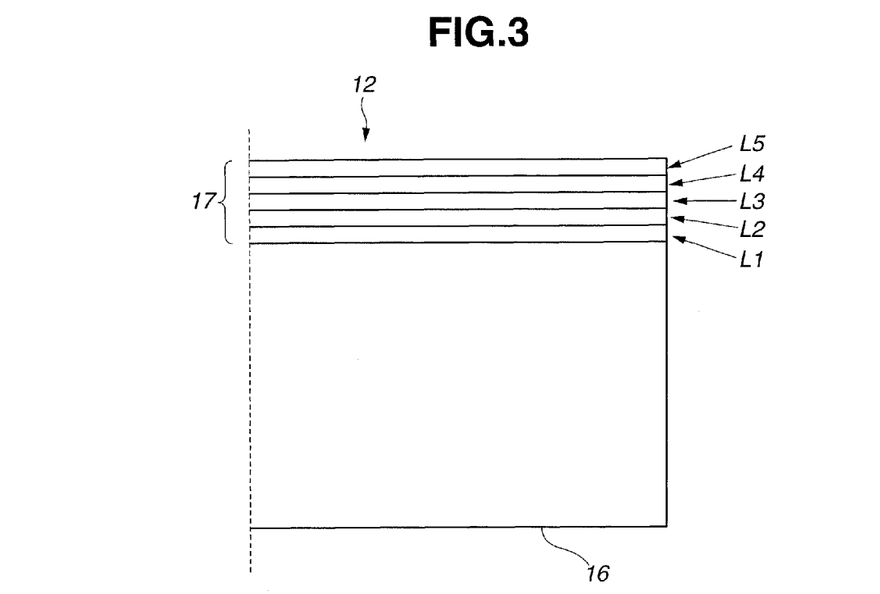
FIG. 3 is a rough cross sectional view representing a structure of the plastic film on which the infrared ray reflective film is formed.

As illustrated in FIG. 3, unit lamination films L1 through L5 were laminated on PET film 16 to prepare plastic film 12 on which infrared ray reflective film 17 is formed.

Unit lamination films L1 through L5 were formed using Polymethylmethacrylate (hereinafter, referred to as PMMA) for the resin film (1) having a low index of refraction and using Polyethylene terephthalate for the resin film (2) having a high index of refraction. (The layer having the low index of refraction formed by using PMMA is called a PMMA layer and the layer having the high index of refraction formed using the Polyethylene terephthalate is called a PET layer). The layers laminated by alternately repeating the PMMA layer (thickness of t1) having the same thicknesses (thickness of t2) were called unit lamination films L1 through L5.

The PMMA layer was coated and formed in a roll coat method using a liquid solved by PMMA in 2-methoxyethyl acetate. The index of refraction was 1.49.

The PET layer was coated while a pellet of PET was molten with an extruder. The index of refraction of the PET layer was 1.65.

Figure 4:
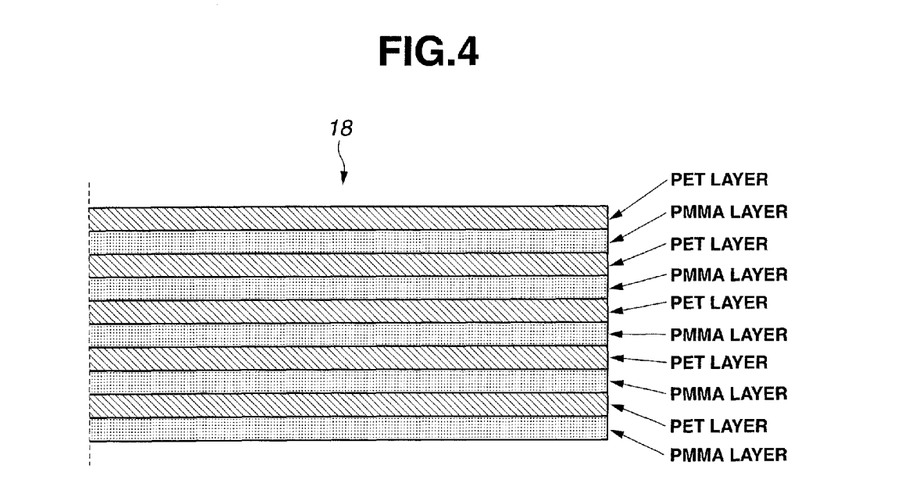
FIG. 4 is a rough cross sectional view representing a unit lamination film in a case where the number of repetitions is five times.
Figure 5:
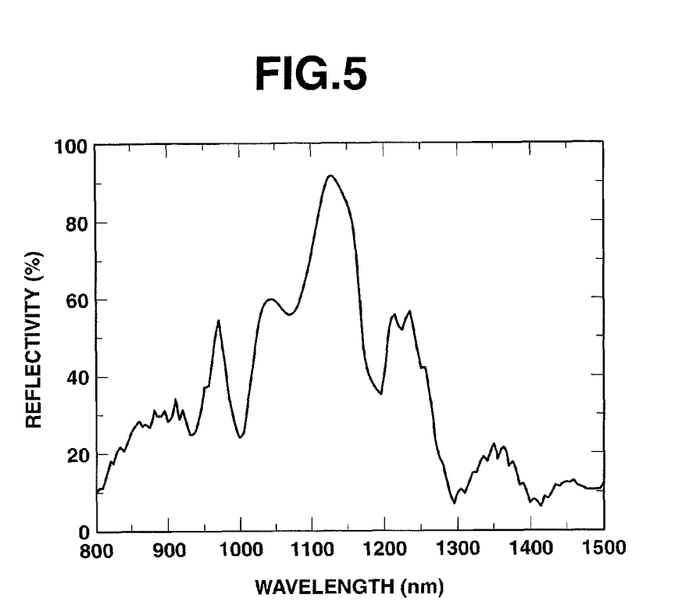
FIG. 5 is a graph representing a reflection of 50-layer infrared ray reflective film.
Figure 6:
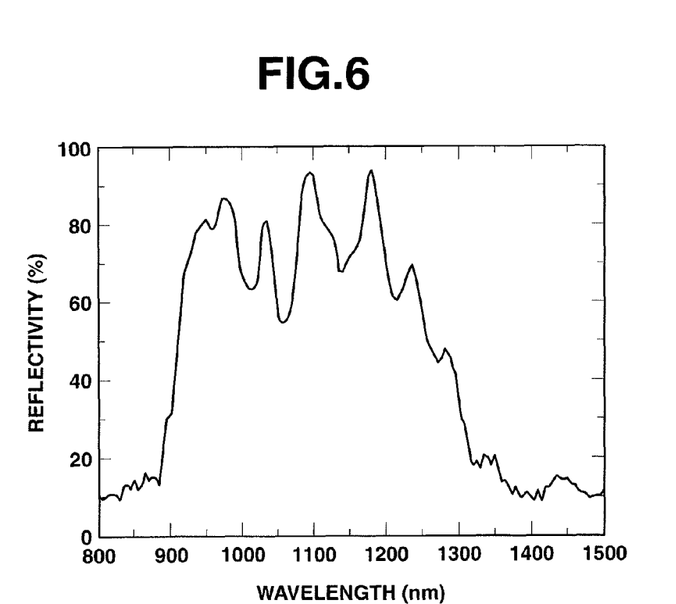
FIG. 6 is a graph representing a reflection of 100-layer infrared ray reflective film.
Figure 7:
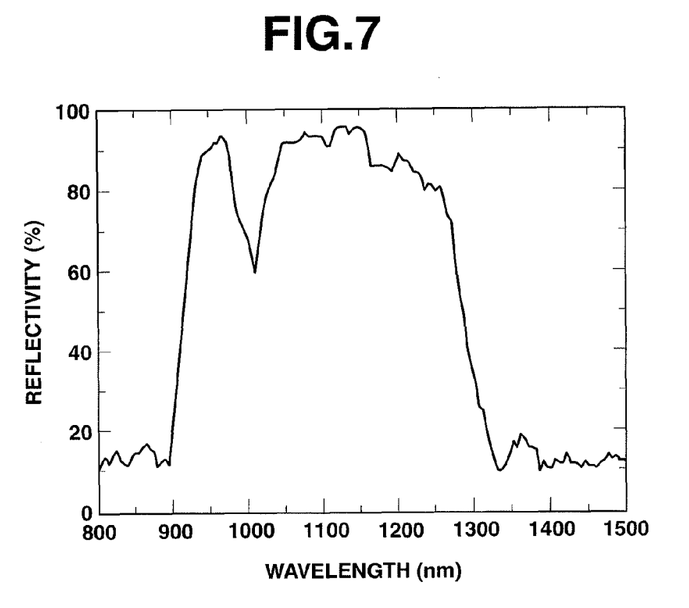
FIG. 7 is a graph representing a reflection of 150-layer infrared ray reflective film.
Figure 8:
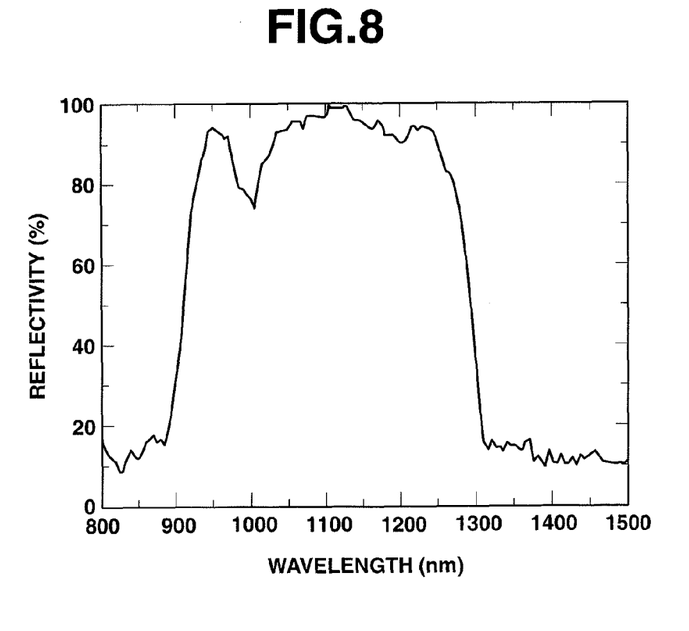
FIG. 8 is a graph representing a reflection of 200-layer infrared ray reflective film.

The number of times of repetitions when the PMMA layer or the PET layer was one lamination unit were 5 times through 20 times (this is called a unit lamination layer film L). FIG. 4 shows a structure of the unit lamination film in a case where the number of times of repetitions were five times.

If the film thicknesses of individual PMMA layers and PET layers were changed and the unit lamination films in which the number of lamination layers are five layers (L1 through L5) to provide infrared lay reflection film A. FIG. 3 shows its film structure.

Infrared ray reflective film B is a sequential lamination of L1 of the 15 times of the number of repetitions, L2 of the 5 times of the number of repetitions, and L3, L4, and L5 of respective 10 times of the number of repetitions on the plastic film. Infrared ray reflective film C is a sequential lamination of L1 of the 20 times opf the number of repetitions, L2 of the 10 times of the number of repetitions, L3, L4, and L5 of the respective 10 times of the number of repetitions. Table 1 represents the thickness of the PMMA layer and the PET layer in each of unit lamination films of L1 through L5 and number of layers. Table 2 represents the thickness of the unit lamination film and the thickness of the infrared ray reflective film.

TABLE 1

| unit lamination film | Thickness of one layer (μm) | | The number of layers of unit Lamination film | | | |
|---|---|---|---|---|---|---|
| | PMMA layer t1 | PET layer t2 | infrared ray reflective film A | infrared ray reflective film B | infrared ray reflective film C | infrared ray reflective film D |
| L5 | 0.172 | 0.191 | each 5 layer | each 10 layer | each 15 layer | each 20 layer |
| L4 | 0.158 | 0.175 | each 5 layer | each 10 layer | each 15 layer | each 20 layer |
| L3 | 0.187 | 0.207 | each 5 layer | each 10 layer | each 15 layer | each 20 layer |
| L2 | 0.165 | 0.183 | each 5 layer | each 5 layer | each 10 layer | each 20 layer |
| L1 | 0.144 | 0.159 | each 5 layer | each 15 layer | each 20 layer | each 20 layer |

TABLE 2

| | | infrared ray reflective film A | infrared ray reflective film B | infrared ray reflective film C | infrared ray reflective film D |
|---|---|---|---|---|---|
| unit lamination film (μm) | L5 | 1.815 | 3.630 | 5.445 | 7.260 |
| | L4 | 1.665 | 3.330 | 4.995 | 6.660 |
| | L3 | 1.970 | 3.940 | 5.910 | 7.880 |
| | L2 | 1.740 | 1.740 | 3.480 | 6.960 |
| | L1 | 1.515 | 4.545 | 6.060 | 6.060 |
| infrared ray reflective film(μm) | | 8.705 | 17.185 | 25.890 | 34.820 |

FIGS. 5 through 8 represent graphs, each representing the index of reflection in infrared ray reflective film A, B, C, and D film formed as infrared reflective film 17. In a case where the number of layers are 50 (FIG. 5), an effective reflective film is obtained as the infrared ray reflective film. If the number of layers is in excess of 200 layers, the increase in the index of reflection cannot be expected. Therefore, it is preferable for the number of layers to be equal to 50 or larger but to be equal to or smaller than 200.

Embodiment 1

A plastic film 12 on which the infrared ray reflective film shown in FIG. 3 was formed using the PET film having a thickness of 60 μm for plastic film 16 was prepared. Infrared ray reflective film D of Table 2 (having the thickness of about 34.8 μm) was used for infrared reflective film 17. The thermal shrinkage of plastic film 13 on which the infrared ray reflective film was formed was 1.5% in the MD direction and was 1% in the TD direction.

The thermal shrinkage was measured as follows in conformity to JIS C 2318.

Figure 2:
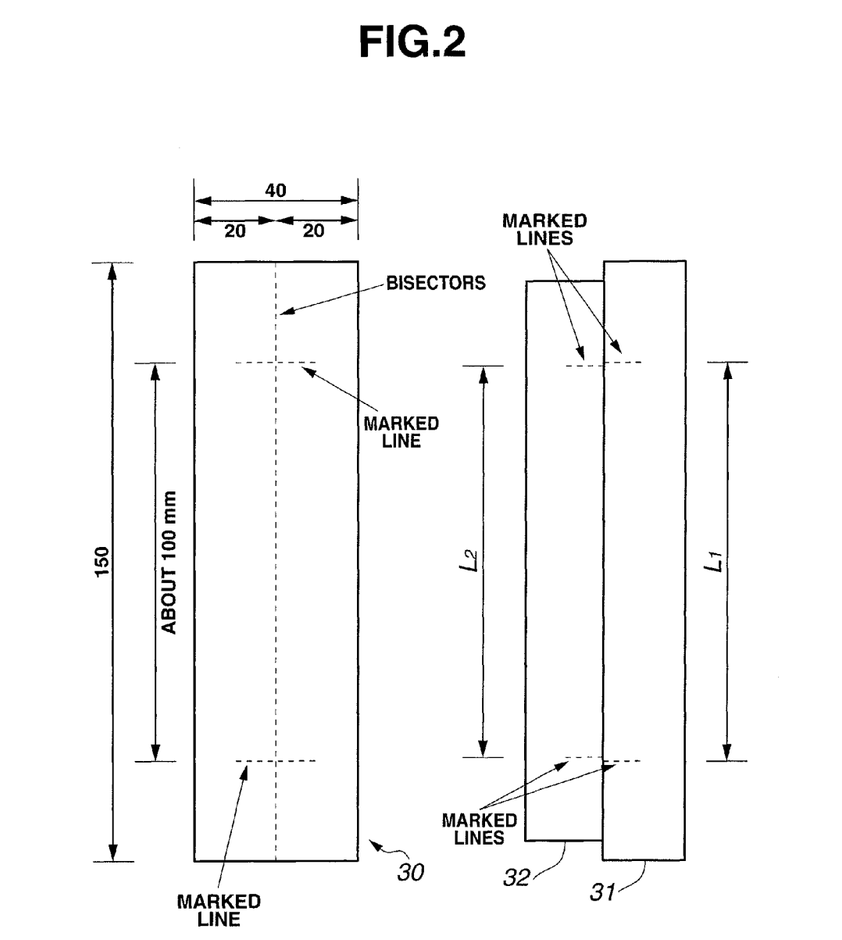
FIG. 2 is a plan view representing a plastic film on which an infrared ray reflective film is formed before and after measurement of a thermal shrinkage.

As shown in FIG. 2, a rectangular film 30 having a length of 150 mm×width of 40 mm was cut down and a diamond pen was used to indicate a marked line at a proximity to a center in the elongated direction thereof at a distance of about 100 mm. After the marked line was indicated, rectangular film 30 was bisected into two equal parts of 150 mm×20 mm.

One of test pieces bisected was suspended vertically within a hot wind circulation type thermostatic oven and the temperature of the test piece was raised to a measurement temperature of 130° C. at a rise temperature speed of about 5° C./minute and held for about 30 minutes at the measured temperature.

Thereafter, the hot wind circulation type thermostatic oven was opened to the air so that a natural cooling for about 20° C./minutes and, furthermore, the test piece was held at room temperature for 30 minutes.

A thermocouple temperature meter was used for the temperature measurement and a temperature distribution within the hot wind circulation type temperature oven was within ±1° C.

Distances of L1, L2 between the marked lines were measured for test piece 31 of the bisected test pieces held at room temperature and for test piece 32 thereof heated at the measurement temperature using a scan type laser microscope 1LM21D made by Lasertech Corporation.

Thermal shrinkage (%) was determined by calculating a formula of $(L1-L2)/L1 \times 100$.

In addition, rectangular film 30 was cut down for each of three sheets of film for respective rectangular films 30 in the MD direction of PET film and in the TD direction thereof. Thermal shrinkage was derived from an average value of thermal shrinkages measured for three sheets of rectangular PET film. Plastic film 12 on which infrared ray reflective film 17 was formed was grasped by two sheets of PVB film, each having the thickness of 0.38 mm. Furthermore, the laminated glass was prepared in the following way using the same shape two sheets of bent glass plate 10, 14, each sheet of glass plate having the dimension of 250 mm×350 mm and the thickness of 2 mm (a minimum value of the radius of curvature was 0.9 m and a maximum value thereof was 1 m).

It should be noted that curved exterior side glass plate 10 and curved interior side glass plate 14 were prepared by bending a float glass. Minimum value of 0.9 m of the radius of curvature was the value placed in the proximity of the surrounding section of glass plates 10, 14 and maximum value of 1 m of the radius of curvature was the value at a center portion of glass plates 10, 14.

It should be noted that interior side glass plate 14, interior side intermediate film 13, plastic film 12 on which infrared ray reflective film was formed, exterior side intermediate film 11, exterior side glass plate 10 were sequentially laminated, extra parts of exterior side intermediate film 11 extruded from the edge portion of the glass plate were cut and eliminated, and, thereafter, were pressure applied and degassing was carried out for 30 minutes in the autoclave heated to 130° C. to perform the lamination process.

There was no wrinkle in the plastic film on which the infrared ray reflective film was formed and no crack in the infrared ray reflective film. Thus, the laminated glass with the plastic film insert having a favorable outer appearance was obtained.

In addition, the laminated glass from which the infrared ray of wavelength of 900 nm through 1500 nm was preferably reflected could be obtained.

Embodiment 2

Plastic film 12 on which infrared ray reflective film shown in FIG. 3 was formed by laminating an acrylic hard coat film (not shown) on both surfaces of plastic film 16, using the PET film having the thickness of 100 μm for plastic film 16, and forming infrared ray reflective film A on one surface of plastic film 16 on which the hard coat film was formed.

The thermal shrinkage of plastic film 12 on which the infrared ray reflective film was formed was 1.5% in the MD direction and was 1% in the TD direction when measured in the same way as in the first embodiment.

Laminated film 1 on which this infrared ray reflective film was formed was prepared as shown in FIG. 1 using plastic film 12 on which this infrared ray reflective film was formed. The bent float glass was used for each of glass plates 10, 14 having the same magnitude and thickness as in the same way as embodiment 1 and having the radius of curvature in a range from 2.8 m to 3 m.

Laminated glass 1 with plastic film insert in this embodiment having no wrinkle of plastic film 12 on which the infrared reflective film was formed and no crack in the infrared ray reflective film and having the favorable outer appearance was obtained.

Embodiment 3

The PET film used in embodiment 1 was used for plastic film 16. The acrylic hard coat film (not shown) having the thickness of 2 μm was laminated on both surfaces of this plastic film 16 and infrared ray reflective film A was formed on the one side surface of plastic film 16. Thus, Plastic film 12 was prepared on which the infrared ray reflective film shown in FIG. 3 was formed.

The thermal shrinkage of plastic film 12 on which this infrared ray reflective film was formed was 1% in the MD direction and was 0.6% in the TD direction when measured in the same way as embodiment 1.

Furthermore, laminated glass 1 with the plastic film insert in FIG. 1 was prepared in the same way as embodiment 1 using plastic film 12 on which this infrared ray reflective film was formed.

Laminated glass 1 with the plastic film insert in this embodiment having a favorable outer appearance was obtained with the laminated glass having no wrinkle in the plastic film on which the infrared ray reflective film was formed and no crack in the infrared ray reflective film.

Embodiment 4

The PET film having the thickness of 100 μm and having the thermal shrinkage of 4% in the MD direction and 3.5% in the TD direction at 130° C. was used for plastic film 16. In the same way as embodiment 3, at the same time when the acrylic hard coat film (not shown) was formed for this PET film to have the thickness of 2 μm, a heat treatment at 50° C. was made, and, furthermore, infrared ray reflective film D in the same way as embodiment 1 was formed. Thus, plastic film 12 was prepared on which the infrared ray reflective film was formed.

The thermal shrinkage of plastic film 12 on which the infrared ray reflective film was formed was 2.0% in MD direction and 1.6% in TD direction when measured in the same way as embodiment 1.

Furthermore, plastic glass 1 with plastic film insert shown in FIG. 1 was prepared in the same way as embodiment 1 using plastic film 12 on which this infrared ray reflective film was formed.

The laminated film with the plastic film insert prepared in this embodiment obtained the laminated film with the plastic film insert having the favorable outer appearance with no wrinkle in the plastic film on which the infrared ray reflective film was formed and with no crack of the infrared ray reflective film.

Embodiment 5

Laminated glass 1 with the plastic film insert using the bent glass plate as shown in FIG. 1 was prepared. Twos of curved glass plates, each having the radius of curvature of 1200 mm, the magnitude of 250 mm×350 mm, and the thickness of 2 mm, were used for curved glass plates 10, 14.

Infrared ray reflective film D was formed on plastic film (PET film) 16 having the thickness of 50 μm and plastic film 12 having a modulus of elasticity of 40 MPa at 130° C. was used.

Laminated glass 1 with the plastic film insert prepared in this embodiment was the laminated glass with the plastic film insert having the favorable outer appearance with no wrinkle observation.

Embodiment 6

The hard coat film (not shown) and infrared ray reflective film A were formed on one side surface of the PET film having the thickness of 100 μm and plastic film 12 on which the infrared ray reflective film shown in FIG. 3 was formed.

The acrylic hard coat film was used and coated to have the thickness of 5 μm.

The modulus of elasticity of plastic film 12 on which the infrared reflective film in the preferred embodiment was formed at 130° C. was 1000 MPa.

Laminated glass 1 with plastic film insert shown in FIG. 1 was prepared in the same way as embodiment 5 other than the use of plastic film 12 on which the infrared ray reflective film described above was formed.

Laminated glass 1 with plastic film insert in this embodiment observed no wrinkle and had the favorable outer appearance.

Embodiment 7

Laminated glass 1 with the plastic film insert shown in FIG. 1 was prepared using the bent glass plates of soda lime glasses through the float method, each having the radius of curvature of 1200 mm, the thickness of 2 mm, and the magnitude of 250 mm×300 mm, for glass plates 10, 14.

The PET film (thickness of 100 μm) was used for plastic film 16. Infrared ray reflective film A was formed on this PET film and the rate of elongation measured at measurement temperature of 150° C. under the load of tensile force of 10 N per 1 m of the film width was 0.02% in the MD direction and was 0.13% in the TD direction.

The measurement of the rate of elongation was carried out in accordance with procedure of 1 through procedure of 5 using Rigaku made thermoflex thermal analyzer (PTC10A).

Interior side glass plate 14, interior side intermediate film 13, plastic film 12 on which infrared reflective film was formed, exterior side intermediate film 11, and exterior side intermediate film 11, and exterior side glass plate were sequentially overlapped, and extra parts of interior side intermediate film 13 protruded from the edge of the glass plate, plastic film 12 on which the infrared ray reflective film was formed, and exterior side intermediate film 11 were cut and eliminated, and, thereafter, the remaining part thereof was heated for 30 minutes and at 130° C. within the autoclave and the lamination process was carried out with the pressure application and degassing. Then, laminated glass 1 with the plastic film insert having the favorable outer appearance was prepared.

Prepared laminated glass 1 with the plastic film insert had no wrinkle outer appearance defect on plastic film 12 on which the infrared ray reflective film was formed and the laminated glass with the plastic film insert having the favorable outer appearance was obtained.

Embodiment 8

The acrylic hard coat film (not shown) was laminated to have the thickness of 5 μm was laminated on both surfaces of PET film 16 having the thickness of 100 μm and infrared ray reflective film D was formed on one side of PET film 16 on which the hard coat film was formed.

The rate of elongation (a state in which the tensile force of 10 N per width of 1 m of the film is loaded) of plastic film 12 on which infrared ray reflective film D was formed and the hard coat film (not shown) was formed was 0.01% or smaller in the MD direction and was 0.19% in the TD direction.

Interior side glass plate 14, interior side intermediate film 13, plastic film 12 on which the infrared ray reflective film was formed, exterior side intermediate film 11, and exterior side glass plate 10 were sequentially overlapped, were heated for 30 minutes at 130° C., and the lamination process under the pressure application and degassing was performed to prepare the laminated glass with plastic film insert 1 shown in FIG. 1.

In prepared laminated glass with the plastic film insert 1, the wrinkle outer appearance defect was not found in plastic film 12 on which the infrared ray reflective film was formed and the laminated glass with the plastic film insert having the favorable outer appearance was obtained.

Comparative Example 1

The PET film used in embodiment 1 was used for plastic film 16, infrared ray reflective film A was formed in the same way as embodiment 1, and plastic film 12 on which infrared ray reflective film in FIG. 3 was formed was prepared.

The thermal shrinkage of plastic film 12 on which the infrared ray reflective film was formed was 0.4% in the MD direction and was 0.2% in the TD direction.

Furthermore, laminated glass 1 with plastic film 12 on which this infrared ray reflective film was formed was prepared in the same way as embodiment 1.

A wrinkle of the plastic film on which the infrared ray reflective film was formed in the surrounding part of the prepared laminated glass with plastic film insert 1 was observed and this was not suited for a practical use due to the defect in the outer appearance.

Comparative Example 2

The PET film having the thermal shrinkage at 130° C. in the MD direction of 1.0% and in the TD direction of 0.5% and having the thickness of 100 μm was used for plastic film 16.

In the same way as embodiment 3, acrylic hard coat film (not shown) with the thickness of 2 μm was formed for this PET film. Furthermore, infrared ray reflective film D which was the same as embodiment 1 was formed. Thus, plastic film 12 on which the infrared ray reflective film was formed was prepared.

The thermal shrinkage of plastic film 12 on which this infrared ray reflective film was formed was measured in the same way as embodiment 1. Then, the measured thermal shrinkage was 0.3% in the MD direction and was 0.2% in the TD direction.

Furthermore, using plastic film 12 on which this infrared ray reflective film was formed, laminated glass with the plastic film insert 1 having the structure shown in FIG. 1 was prepared.

A wrinkle in the plastic film on which the infrared ray reflective film was formed was observed in the surrounding section of prepared laminated glass so that the outer appearance defect occurred and it was difficult to be put into practice.

Comparative Example 3

The PET film having the thermal shrinkage of 8% in the MD direction and 7% in the TD direction at the temperature of 130° C. was used for plastic film 16. In the same way as embodiment 3, the acrylic hard coat film (not shown) was formed to have the thickness of 2 μm for this PET film. Thus, plastic film 12 on which the infrared ray reflective film D, in the same way as embodiment 1, was formed was prepared.

The thermal shrinkage of plastic film 12 on which the infrared ray reflective film was formed was measured in the same way as embodiment 1 and was 7% in the MD direction and 6% in the TD direction.

Furthermore, laminated film with the plastic film insert 1 shown in FIG. 1 was prepared in the same way as embodiment 1 using plastic film 12 on which the infrared ray reflective film was formed.

A wrinkle defect was not found on plastic film 12 on which the infrared ray reflective film was formed, in the prepared laminated glass with the plastic film insert 1, but cracks were generated on the whole surface of infrared ray reflective film 17 and it was difficult to be suited for practical use.

Comparative Example 4

Laminated glass with the plastic film insert 1 was prepared in the same way as embodiment 1 except that the curved same shape two sheets of glass plate, each having the magnitude of 250 mm×350 mm, having the thickness of 2 mm, and having the radius of curvature of the minimum value of 0.7 m at the proximity of the surrounding section and the radius of curvature of 0.8 m at the center thereof, were used for glass plates 10, 14.

The wrinkle of the plastic film on which the infrared ray reflective film was formed was observed at the surrounding section of the prepared laminated glass with the plastic film insert 1 and, since the outer appearance defect occurred, it was not suitable for the practical use.

Comparative Example 5

Laminated glass with plastic film insert 1 was prepared in the same way as embodiment 5 except that infrared ray reflective film A was formed on the PET film having the thickness of 50 μm and the plastic film on which the infrared ray reflective film having the modulus of elasticity at 130° C. of 20 MPa was formed was used.

The wrinkle outer appearance defect was developed on the whole surface of laminated glass with the plastic film insert prepared in this comparative example.

Comparative Example 6

Laminated glass with the plastic film insert 5 was prepared in the same way as embodiment 5 except that infrared ray reflective film D was formed on PET film 16 having the thickness of 100 µm and the plastic film on which the infrared ray reflective film was formed having the elasticity at 130° C. of 3000 MPa was used.

Laminated glass with plastic film insert 1 prepared in this comparative example indicated a degassing failure state in which air between the PVB at the center portion of glass and the plastic film was left and could not be put into practice.

Comparative Example 7

Laminated glass with plastic film insert 1 shown in FIG. 1 was prepared in the same way as embodiment 7 except that PET film (having the thickness of 100 µm) having the rate of elongation of 0.3% at 130° C. was used for plastic film 12 on which the infrared ray reflective film was formed.

The wrinkle outer appearance defect was developed on the whole surface of prepared laminated glass with the plastic film insert 1.

EXPLANATION OF SIGNS

1 laminated glass with the plastic film insert
10 interior side glass plate
11 exterior side glass plate
12 plastic film on which the infrared ray reflective film was formed
13 interior side resin intermediate film
14 interior side glass plate
16 plastic film
17 infrared ray reflective film
18 unit lamination film
30 rectangular film
31, 32 test piece

The invention claimed is:

1. A laminated glass with a plastic film insert, prepared using a film constituted by grasping the plastic film between two sheets of resin intermediate film, comprising:
   a glass plate bent through a bending process thereof; and the film, wherein the plastic film is one plastic film selected from polyethylene terephthalate, polyethylene naphthalate, polycarbonate, polymethylmethacrylate, polyether sulfone, nylon, polyarylate, and cycloolefin polymer, a thickness of the plastic film ranges from 30 to 200 µm, an infrared ray reflective film in which resin films having different indexes of refractions are alternately laminated is formed on the plastic film, and the plastic film on which the infrared ray reflective films is formed satisfies at least one of the following conditions of (A): a thermal shrinkage of the plastic film falls in a range from 0.5% to 3% in a temperature range of 90 through 150° C., (B): a modulus of elasticity falls in a range from 30 MPa to 2000 MPa, and (C): a rate of elongation of the plastic film is 0.3% or less when a tensile force of 10 N is applied to the plastic film per one-meter width and wherein a radius of curvature of the bent glass plate is in a range from 0.9 m to 3 m, wherein a hard coat film is formed on an interface between the plastic film and the resin intermediate film, and wherein a film of a silane coupling agent is formed on an interface between the hard coat film and the resin intermediate film.

2. The laminated glass with the plastic film insert as claimed in claim 1, wherein the infrared ray reflective film comprises a multi-layer film having a number of layers of 50 through 200 and having an alternate lamination of a resin film (1) and a resin film (2), both of the resin films having different indexes of refraction.

3. The laminated glass with the plastic film insert as claimed in claim 1, wherein the infrared ray reflective film is formed with unit lamination films laminated by 2 through 6 with thicknesses of t1 and t2 varied, each of the unit lamination films being an alternate lamination of totally 10 through 40 layers of a resin film (1) having the thickness of t1 and another resin film (2) having the thickness of t2.

4. The laminated glass with the plastic film insert as claimed in claim 1, wherein one sheet of resin intermediate film is an infrared ray absorption film containing particles of an electrically conductive oxide for an infrared ray absorbing material and a thickness of the resin intermediate film is in a range from 0.3 through 1.2 mm.

5. The laminated glass with the plastic film insert as claimed in claim 1, wherein a film of a silane coupling agent is formed on an interface between the plastic film and the resin intermediate films.

6. A laminated glass with a plastic film insert, prepared using a film constituted by grasping the plastic film between two sheets of resin intermediate film, comprising:
   a glass plate bent through a bending process thereof; and the film, wherein the plastic film is one plastic film selected from polyethylene terephthalate, polyethylene naphthalate, polycarbonate, polymethylmethacrylate, polyether sulfone, nylon, polyarylate, and cycloolefin polymer, a thickness of the plastic film ranges from 30 to 200 µm, an infrared ray reflective film in which resin films having different indexes of refractions are alternately laminated is formed on the plastic film, and the plastic film on which the infrared ray reflective films is formed satisfies all of the following conditions of (A): a thermal shrinkage of the plastic film falls in a range from 0.5% to 3% in a temperature range of 90 through 150° C., (B): a modulus of elasticity falls in a range from 30 MPa to 2000 MPa, and (C): a rate of elongation of the plastic film is 0.3% or less when a tensile force of 10 N is applied to the plastic film per one-meter width, and wherein a hard coat film is formed on an interface between the plastic film and the resin intermediate film and wherein a film of a silane coupling agent is formed on an interface between the hard coat film and the resin intermediate film.

* * * * *